US006307466B1

(12) United States Patent
Ferris

(10) Patent No.: US 6,307,466 B1
(45) Date of Patent: *Oct. 23, 2001

(54) TWO STAGE GAUGE WITH ELECTRICAL SIGNAL OUTPUT

(75) Inventor: Gregory Matthew Ferris, Cedar Falls, IA (US)

(73) Assignee: Engineered Products Company, Waterloo, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/340,269

(22) Filed: Jun. 25, 1999

(51) Int. Cl.⁷ .................................................. B60Q 1/00
(52) U.S. Cl. .................... 340/438; 340/607; 340/611; 116/268; 116/DIG. 25
(58) Field of Search ................................ 340/438, 461, 340/601, 607, 611; 73/746, 721; 116/264, 266, 268, 272, 281, DIG. 25

(56) References Cited

U.S. PATENT DOCUMENTS

| 2,946,222 | 7/1960 | Husjack . |
| 3,594,745 | 7/1971 | Nickels . |
| 3,654,414 | 4/1972 | Kudlaty . |
| 3,696,666 | 10/1972 | Johnson et al. . |
| 3,939,457 | 2/1976 | Nelson . |
| 3,963,891 | * 6/1976 | De Mogondeaux ................. 200/308 |
| 4,033,733 | 7/1977 | Nelson . |
| 4,171,962 | 10/1979 | Kippel et al. . |
| 4,183,029 | 1/1980 | Isayama et al. . |
| 4,189,724 | * 2/1980 | Onuma .................................. 340/607 |
| 4,279,162 | 7/1981 | Neill et al. . |
| 4,369,728 | 1/1983 | Nelson . |
| 4,423,751 | 1/1984 | Roettgen . |
| 4,445,456 | 5/1984 | Nelson . |
| 4,937,557 | 6/1990 | Tucci et al. . |
| 5,092,177 | 3/1992 | Varacca . |
| 5,239,861 | 8/1993 | Fujita et al. . |
| 5,315,875 | 5/1994 | Benedikt et al. . |
| 5,477,731 | 12/1995 | Mouton . |
| 5,774,056 | 6/1998 | Berry, III et al. . |
| 5,850,183 | * 12/1998 | Berry .................................. 340/607 |

* cited by examiner

Primary Examiner—Jeffery Hofsass
Assistant Examiner—Anh La
(74) Attorney, Agent, or Firm—Oppenheimer Wolff & Donnelly LLP

(57) ABSTRACT

A two stage air filter restriction indicating device communicates with the supply of air passing from an air filter to the air intake of an engine. The amount of vacuum required by the engine to supply air is directly indicative of the amount of blockage in the air filtering system. The gauge or air filter restriction indicating device monitors this vacuum level and provides signals at an output indicating whether a predetermined vacuum level has been achieved. In one configuration, the gauge locks into this configuration and maintains its output, even when the engine is shut off. Alternatively, the gauge of the present invention automatically resets, thus not requiring a manual reset of the gauge.

22 Claims, 11 Drawing Sheets

TWO STAGE GAUGE WITH ELECTRICAL SIGNAL OUTPUT

BACKGROUND OF THE INVENTION

The present invention relates generally to a mechanical filter gauge for determining the filtering capability of a vehicle filter. Specifically, the present invention relates to a mechanical gauge for measuring the functionality of a vehicle's air filter and providing a related electrical signal at an output.

Air filter restriction gauges are used in connection with an air filter for internal combustion engines. These devices typically sense the level of airflow restriction, and then indicate the level of restriction by locking itself in position. When the air filter has become so loaded with contaminants that the supply of air required by the engine for its operating efficiency is not being drawn through the filter, the gauge will indicate this and thus alert the operator that the filter requires cleaning or replacement. Some existing devices also lock themselves in various positions to provide a continuous indication as to how much useful life remains in the air filter before it should be cleaned or changed.

The use of a gauge to monitor the filtering ability of a vehicle's air filter is known in the art. Earlier patents in this area include U.S. Pat. No. 4,369,728, issued to Nelson on Jan. 25, 1983, and U.S. Pat. No. 4,445,456, issued to Nelson on May 1, 1984. These devices provided a visual display to the users or maintenance personnel. They did not have provisions to output an electrical signal indicative of the gauge's status.

By including an electrical component to the gauge, an indicator light within the cab of the vehicle can be added. The electrical component can simply be a switch which opens or closes when predetermined conditions are met. A dashboard indicator light could then be switched appropriately. However, the signal in the vehicle and the gauge near the engine would not always agree with each other using these prior art devices. Further, the dashboard light would not always remain on until the filter was serviced and the gauge reset. Also, as disclosed, these switches were relatively expensive to manufacture and assemble. The dashboard light signal could sometimes light before the gauge actually reached "redline," or the point at which the air filter required replacement. Further, the dashboard light signal could flicker or not remain lit after the gauge had reached redline. The mere presence of the gauge and dashboard indicator will in most cases cause the driver of the vehicle to rely on the signal being given. However, if a signal is unclear, or gives a false indication that the filter is not yet in need of replacement, serious engine damage could result.

Once a clean and predictable signal could be developed as an output from the gauge, this signal could also be input to a computer control system or system controller to coordinate many functions. For example, this could provide an indication of an engine's operating conditions.

As mentioned above, several air filter restriction indicator gauges have been available for quite some time. Initially, these indicator gauges were simply a single stage type gauge where a warning button would pop once a predetermined restriction level was achieved. These gauges were phased out in favor of the incremental type gauges. The pop-up type gauges were not believed to be reliable and typically not trusted. The incremental type gauges would display an indication of the amount of filter left, thus would provide more reliable and believable information to the users. However, again as mentioned, none of these incremental gauges included reliable switching indicators which could be used to generate displays or to feed a system controller. If input to the system controller, even a single stage gauge is valuable as this provides meaningful information to the controller. Further, even a gauge which does not lock after predetermined levels nor requires manual resetting is provided, beneficial information can be measured and tracked.

Additionally, prior art indicators have not always been easy to fully reset, sometimes resulting in a gauge that may give a false, premature signal that an air filter requires replacement. This may in turn result in unnecessary filter maintenance.

SUMMARY OF THE INVENTION

The switch gauge of the present invention measures the performance of the filter and signals when the air filter of an internal combustion engine requires servicing or replacement. The measurement is accomplished by monitoring the vacuum in the air intake system of the vehicle. The level of vacuum achieved during engine operation is indicative of the air filter's condition. The device can gradually sense the status of the filter, from a clean condition to a dirty filter condition.

In the filter gauge of the present invention, a vacuum level of a predetermined level has been reached, a switch within the internal sensing chamber of the gauge is actuated. The switch can either be maintained or locked in this on position, even after the engine has been shut off, or the switch can be released at engine shut off. Stated alternatively, in a first configuration, the gauge of the present invention locks in a "set" condition after the predetermined level of vacuum has been achieved. When this lock takes place, the switch is maintained in a closed configuration. Alternatively, in another embodiment, the switch is only actuated when the engine is operating at the predetermined vacuum level. When the engine is subsequently shut off, the switch changes its condition. In each of these cases, the information can be used to alert the user, or to provide valuable control information to a system controller.

An object of the invention is to provide a gauge for indicating that an air filter for a vehicle with an internal combustion engine requires replacement.

It is a further object of the invention to provide such a gauge that is easily reset after each filter change.

It is another object of the present invention to provide a device which produces a signal indicative of whether or not a predetermined vacuum level has been achieved. This signal can then be used to alert the user that the filter must be replaced. This information can be provided to the user either via a warning light placed on the dash, or through an overall control system which monitors and coordinates the operations of the vehicle.

It is an additional object of the present invention to provide a device which produces a signal indicating when the engine is operating at a predetermined level of restriction in the air filter. This signal will maintain a certain condition as long as the engine is running and the predetermined vacuum level is maintained. When the engine is shut off, or the vacuum level is no longer above the predetermined amount, the signal will then change states, indicating that this operating condition no longer exists for whichever reason. These signals are easily transmitted to a overall engine controller system.

It is a further object of the present invention to provide a system which produces a constant signal once a predetermined vacuum level has been achieved. This signal will then remain the same until it is reset either manually or via a coordinated computer control reset.

It is yet another object of the present invention to provide a device which will produce both a visual and electrical indication that a predetermined vacuum level has been achieved. By placing a window in the housing, and appropriately configuring an indicator device, the visual indication is achieved. The visual indicator will not be seen when the device is below the predetermined level, however the indicator will be seen when the predetermined vacuum level has been achieved.

BRIEF DESCRIPTION OF THE DRAWINGS

Other objects and advantages of the invention will become apparent from the following detailed description and from the appended drawings, where like numbers have been used to describe like parts throughout the several views, in which.

DETAILED DESCRIPTION OF PREFERRED EMBODIMENTS

Figure 1:
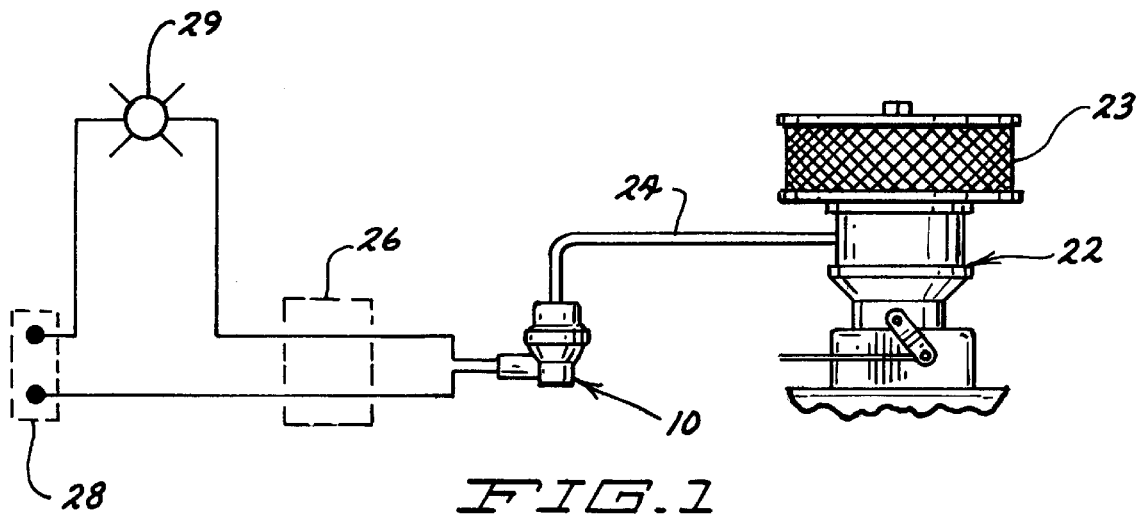
FIG. 1 is a schematic view of an air intake system for an internal combustion engine incorporating the switch gauge of the present invention.
Figure 2:
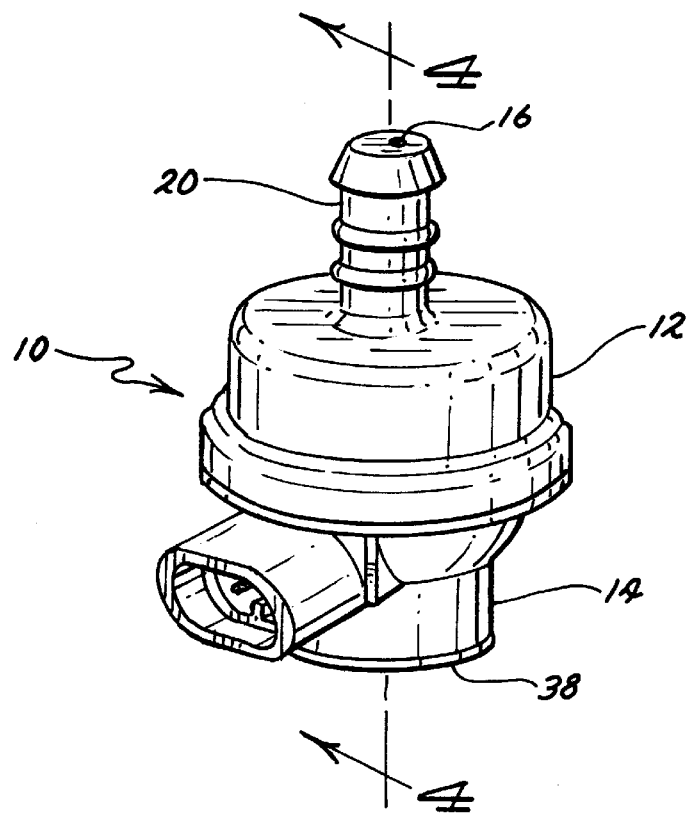
FIG. 2 is a perspective view of the switch gauge of the present invention.

With reference to the drawings, and in particular to FIG. 2, a switch gauge of the present invention is generally indicated by reference numeral 10. Switch gauge 10 includes a housing 12, and a base cap 14. Housing 12 includes a preferably generally cylindrical attachment member 20 for attachment to air intake system 22 of a vehicle's internal combustion engine, preferably via a tube 24, as shown in FIG. 1.

Referring to FIG. 1, switch gauge 10 is shown schematically attached to a vehicle's air intake system 22, and also electrically attached to a control system 26. Control system 26 and switch gauge 10 are both powered by a power source 28, preferably the vehicle's battery. Control system 26 may include a light 29 mounted on the dashboard of the vehicle to provide an indicator to the driver of the vehicle. Other indicators, or combinations of indicators, such as a buzzer, a voice message, or a text message, could also be used to achieve the same result.

Control system 26 may include a computerized controller for operating many different functions in a vehicle. It is understood that an indicator light alone could be connected to the switch output to provide appropriate indications to the user. Alternatively, a sophisticated system monitoring device for coordinating and operating many functions of the engine and vehicle could also be used.

Figure 3:
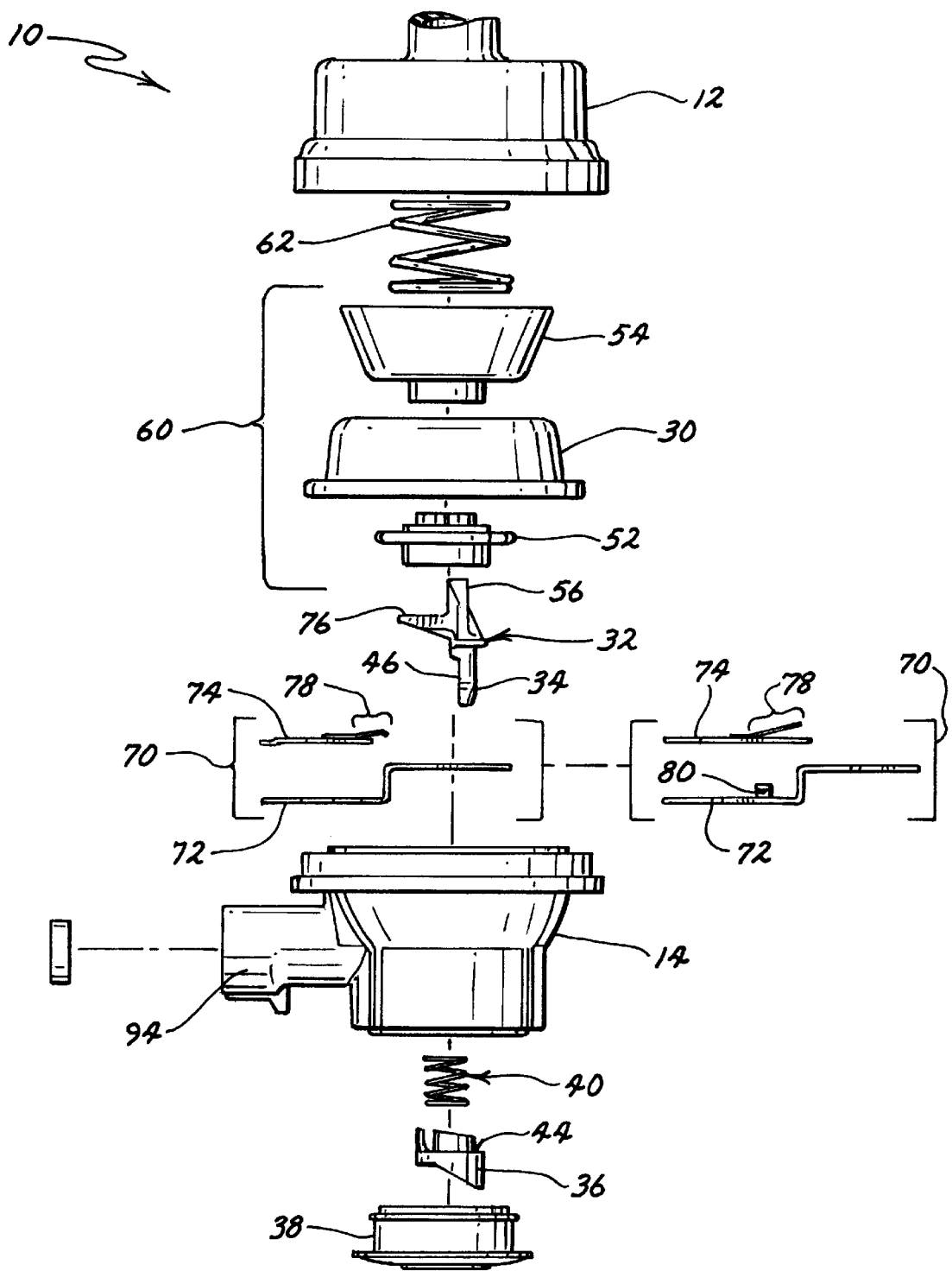
FIG. 3 is an exploded view of the switch gauge illustrated in FIG. 2.
Figure 4:
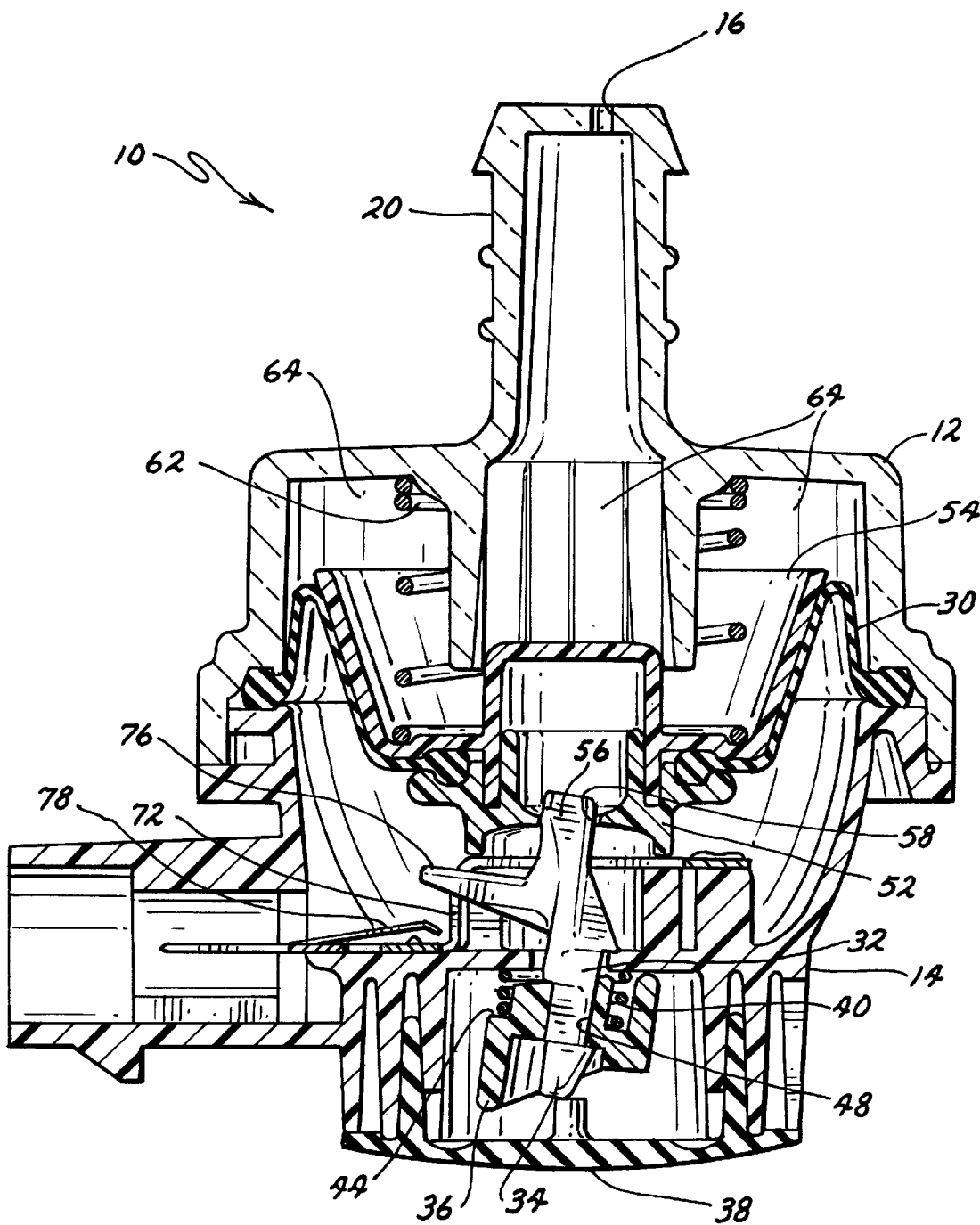
FIG. 4 is a vertical section view of the switch gauge taken along line 4—4 of FIG. 2.

Referring to FIGS. 3 and 4, the switch gauge 10 includes a lockpin 32 pivotally attached to and projecting outwardly from base cap 14. A base portion 34 of lockpin 32 is coupled to a reset coupling 36, which in turn is actuated by a flexible reset cover 38. A reset spring 40 bears against base cap 14 to bias reset coupling 36 away from base cap 14. Additionally, reset spring 40 ensures appropriate alignment for necessary contact between reset cover 38 and base portion 34 of lockpin 32. Reset Spring also holds lockpin 32 in position such that base portion 34 extends through base cap 14 while the remainder extends upwardly from base cap 14. Reset coupling 36 includes a bearing surface 44 which reset spring 40 bears against. It is preferred that base portion 34 of lockpin 32 include a groove along a portion of the diameter thereof (not shown) to permit compression thereof when bring attached to reset button 36. Many other attachment mechanisms could also be used, including press fits, threads, glue, etc. Base portion 34 also includes a flat surface 46 which bears against a mating flat inner surface 48 on reset coupling 36 to insure proper positioning of the two components relative to one another. During assembly, it is also preferable to apply a small amount of adhesive to ensure the permanent retention of base portion 34 within the opening of reset button 36.

Switch gauge 10 also includes a flexible diaphragm 30 which is attached to a lock ring or sealing ring 52 and an alignment cup 54. As can be seen, lock ring 52 is attached to one side of diaphragm 30 whereas an alignment cup 54 is attached to the other side. This attachment mechanism causes flexible diaphragm 30 to be sandwiched between these two elements (alignment cup 54 and locking ring 52). A diaphragm assembly 60 is thus created which includes lock ring 52, flexible diaphragm 30, and alignment cup 54. As such, an airtight seal is created between these elements, thus not allowing air to pass through this interface. Similarly, diaphragm 30 is sandwiched between housing 12 and base cap 14. Again, this seal is designed to be air tight. Through these various seals, an internal chamber 64 is created within switch gauge 10. This internal chamber 64, generally existing beneath housing 12, is in communication with gauge input 16, however is isolated from the remainder of the gauge. This allows switch gauge 10 to measure the vacuum signal presented at input 16 and maintain a closed system.

Lockpin 32 has an upper portion 56 which is configured to extend through an opening 58 in lock ring 52. The relationship of these elements accommodates proper operation between multiple positions of the diaphragm assembly 60.

A calibration spring 62 bears against the upper, interior surface of housing 12 on one end, and against alignment cup 54 on the other. Attachment member 20 of housing 12 engages tube 24, which in turn intersects air intake 22, which carries air from the air filter 23 to the engine (not shown).

With general reference back to FIG. 1, it will be understood that there are many different ways to attach switch gauge 10 to engine air intake 22. For example, a threaded attachment could extend outwardly from air intake 22 which would accommodate attachment of switch gauge 10 thereto. Further, a bayonet-type mount could be used which again would attach directly to air intake 22. Generally speaking, any mechanism could be used which would physically connect switch gauge 10 so that input 16 is exposed to the pressure signals within the air intake 22.

As the air filter in the air intake system 22 becomes dirty from extended use, the amount of air allowed to pass through it decreases, although the vehicle's internal combustion engine continues to draw air at a steady rate. As the amount of air passing through the filter decreases, there is a corresponding decrease in the air pressure and a resulting vacuum in air intake system 22. This vacuum is communicated through attachment member 20 and the corresponding inner chamber 64 within housing 12. As this vacuum increases, the negative air pressure gradually overcomes the force of calibration spring 62, and alignment cup 54 is drawn upwards, or toward attachment member 20. As alignment cup 54 is drawing toward attachment member 20, the edge of lock ring opening 58 engages an upper portion 56 of lockpin 32. Thus, even after the vehicle's engine is turned off, diaphragm assembly 60 is maintained in its prior position.

Figure 7:
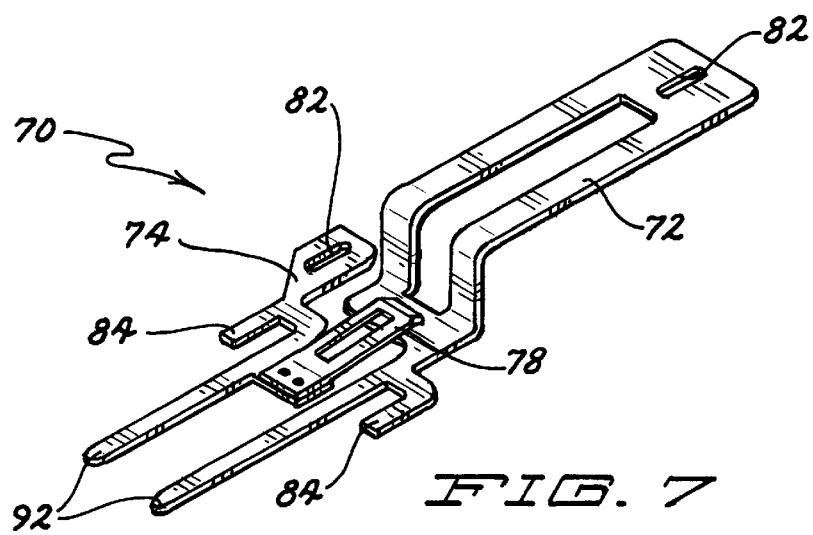
FIG. 7 is a perspective view of one switching assembly used in the present invention.

While still referring to FIGS. 3 and 4, switch gauge 10 further includes an electrical contact or switch assembly 70 which is configured to interact with lock pin 32. Shown along in FIG. 7 is switch assembly 70 which includes a base contact 72 and a leaf contact 74. Both base contact 72 and leaf contact 74 are attached to base cap 14 at a position which is adjacent a lever portion 76 of lock pin 32. As can be seen in FIG. 4, base contact 72 is configured to follow the internal dimensions of base cap 14. Leaf contact 74 includes a resiliently deformable member 74 which is held in a cooperating position relative to base contact 72. More specifically, resiliently deformable member, or leaf contact 74 includes a lever arm portion 78, which is situated at an angle to the plane of base contact 72. As can be appreciated, this lever portion is specifically designed to cooperate with base contact 72 to accomplish the desired switching action.

Figure 9:
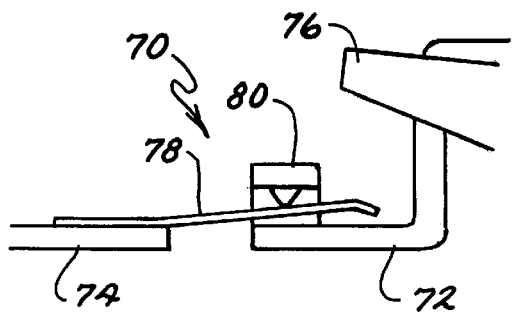
FIG. 9 is a side view of one alternative configuration for the switching assembly.

Base contact 72 and leaf contact 74 can be configured as a normally open switch or a normally closed switch. In a normally open configuration, lever portion 78 of leaf contact 74 is held slightly above base contact 72. When desired to have the switch closed, lever portion 78 is depressed, thus creating contact with base contact 72. Alternatively, in a normally closed configuration, as shown in FIG. 9 base contact 72 includes an extension 80 which extends above the planar surface of base contact 72. Extension 80 is configured to interact with lever arm 78 such that contact between those two elements is maintained when lever arm 78 is in its normal position. Subsequently, when lever arm 78 is depressed, contact between extension 80 and lever arm 78 is broken, thus opening a circuit between those two elements.

Figure 8:
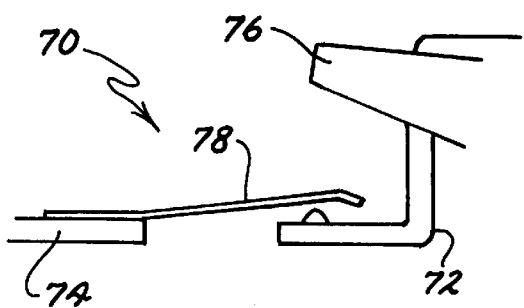
FIG. 8 is a side view of the switching assembly shown in FIG. 7.

A more complete view of switch assembly 70 in its normally open configuration can be seen by referring to FIGS. 7 and 8. As can be seen, both base contact 72 and leaf contact 74 both include alignment holes 82 along with mounting tabs 84. Each of these elements interact with structures on the internal surface of base cap 14 to accommodate proper alignment and mounting. For example, posts are molded on the interior surface of base cap 14 which pass through alignment holes 82. Further, mounting structures are included in base cap 14 which occupy the space created by mounting tabs 84. To secure both base contact 72 and leaf contact 74 to base cap 14, these mounting structures are simply deformed to hold these contacts in place. As can be appreciated, multiple methods or structures for attachment could be used including adhesives, glues, screws, tacks, rivets, etc.

Figure 6:
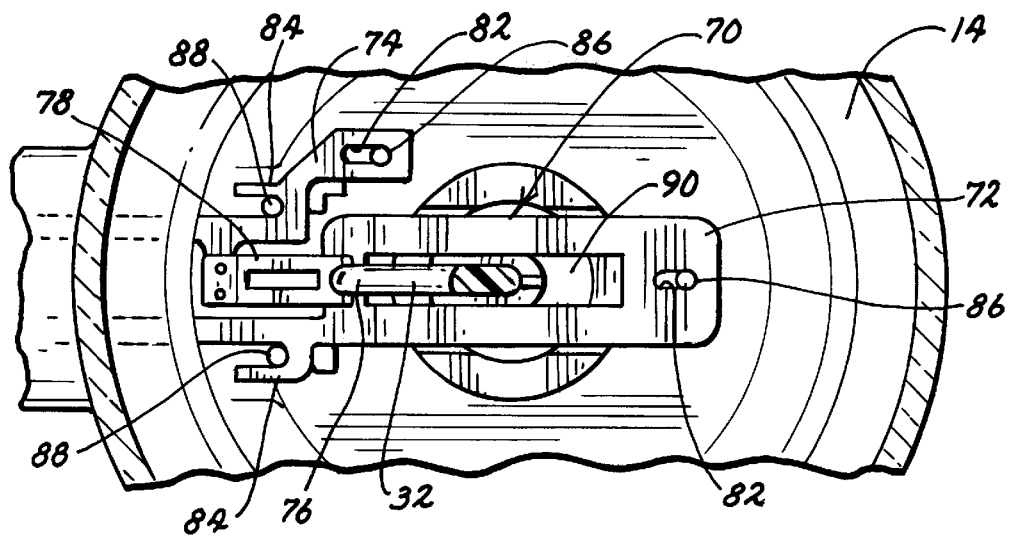
FIG. 6 is a partial section view showing a top view of the locking pin and switching terminal.

Referring now to FIG. 6, a top view of switch assembly 70 is shown after installation in base cap 14. As previously mentioned, base cap 14 includes alignment pins 86 which are configured to be inserted into alignment holes 82. Base cap 14 also includes attachment pins 88 which are configured to interact with a slot created between mounting tabs 84 and the remainder of the respective contact (base contact 72 or leaf contact 74). To attach base contact 72 and leaf contact 74 to base cap 14, attachment pins 88 are simply deformed to surround and cover the associated contact. Prior to their deformation, attachment pins 88 and alignment pins 86 are configured substantially the same.

Also shown in FIG. 6 is lock pin 32. As can be seen, lock pin 32 is situated in a central recessed 90 within base contact 72. As will be later described, this allows lock pin 32 to have its appropriate range of motion. Lever portion 76 of lock pin 32 is specifically aligned to extend above leaf contact lever portion 78. This alignment allows lock pin 32 to appropriately carry out the switching function of the present invention.

Figure 16:
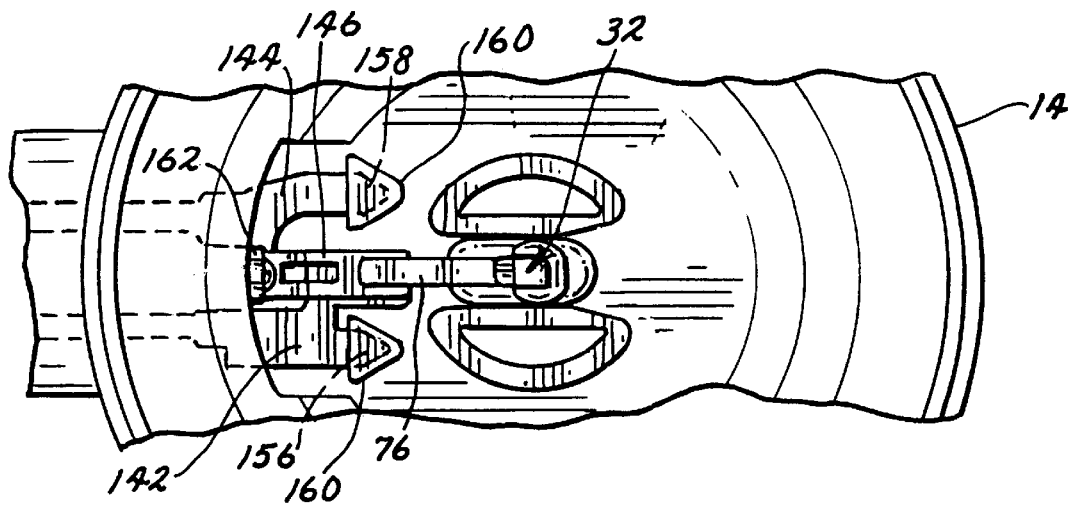
FIG. 16 is a top view of an alternative configuration for a switching assembly.
Figure 17:
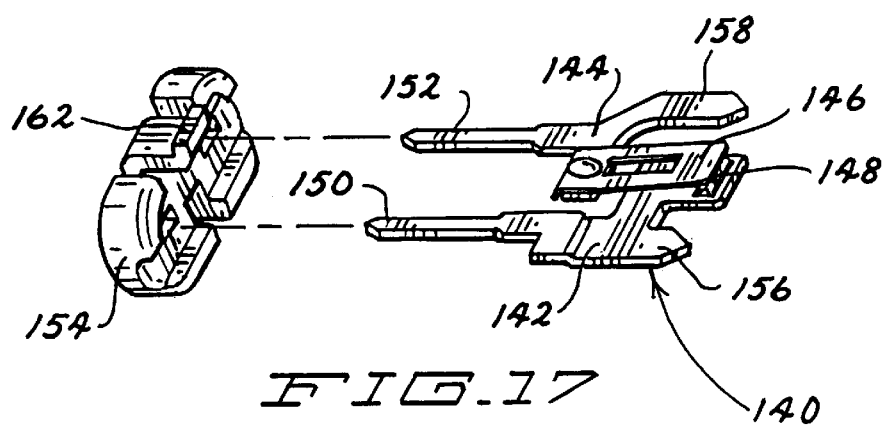
FIG. 17 is a perspective view of the alternative switch assembly shown in FIG. 17.
Figure 18:
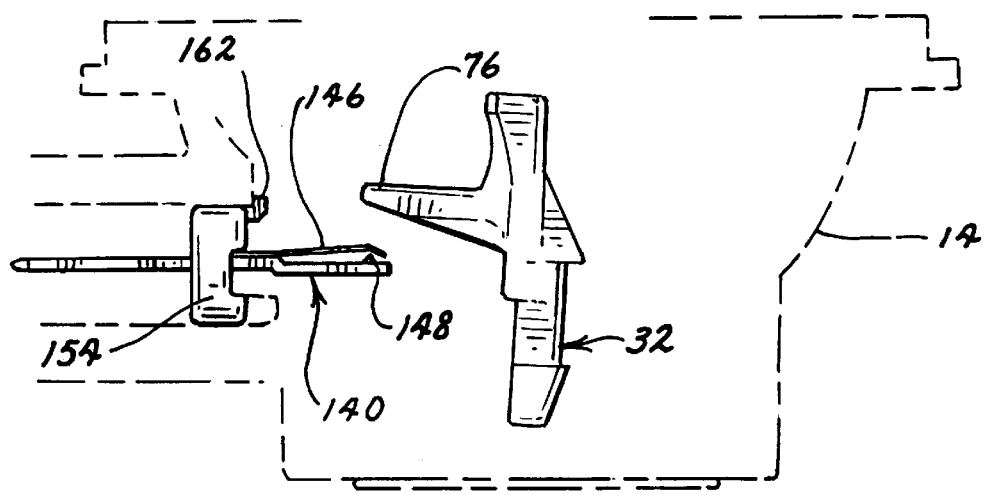
FIG. 18 is a side view of the alternative switching assembly and lock pin.

Alternative configurations for the switch assembly can easily be used. Shown in FIGS. 16 through 18 is a modified switch assembly 140 which operates substantially similarly to that previously described. Once again, modified switch assembly 140 includes a base contact 142 and a spring contact 144. Attached to spring contact 144 is a leaf spring or switch blade 146 which cooperates with other elements of switch gauge 10 to perform the desired switching function. Base contact 142 further includes a switch projection 148 which provides a contact point for switch blade 146. As is obvious from viewing the figures, physical contact between switch blade 146 and switch projection 148 will provide electrical continuity between base contact 142 and spring contact 144.

As can be seen, base contact 142 has a connection pin 150 on one side thereof. Similarly, spring contact 144 has a connection pin 152 extending from one side thereof. A pin housing 154 is utilized to appropriately hold and align both connection pins 150 and 152. Both base contact 142 and spring contact 144 also have holding tabs 156 and 158 extending outwardly opposite the respective connection pin 152 and 154.

Referring now specifically to FIG. 16, the cooperation of holding tabs 156 and 158 with a pair of attachment structures 160 within base cap 14 can be seen. More specifically, attachment structures 160 are configured to have an internal slot (not shown) into which holding tabs 156 and 158 are positioned. These internal slots are configured to completely surround holding tabs 156 and 158 and appropriately position entire modified switch assembly 140. As previously mentioned, pin housing 154 attaches and holds connection pins 150 and 152 at the other end of base contact 142 and spring contact 144.

In FIG. 18, the attachment mechanism between pin housing 154 and base cap 14 can be seen. Pin housing 154 is designed to be inserted into an opening in base cap 14 and attached thereto. Thus, the combination of pin housing 154 and attachment structures 160 hold the entire modified switch assembly 140 in place. Pin housing 154 includes a locking tab 162 which cooperates with base cap 14 to provide secure attachment of connector pins 150 and 152. That is, locking tab snaps into an appropriate recess in base cap 14 to retain pin housing 154 in place. This is important as it accomodates the attachment of an electrical connector to the appropriate connection pins.

As with the earlier described switch assembly, modified switch assembly 140 cooperates with lock pin 32 to provide appropriate switching. As can be seen in FIGS. 16 and 18, lock pin 32 is again appropriately aligned to have a lever portion 76 extend directly above switch blade 146. When lock pin 32 is moved to its locked position, lever portion 76 will contact switch blade 146, thus causing closure of switch assembly 140. More specifically, causing contact between switch blade 146 and switch contact 148. As will be recognized, many different configurations for the actual switch assembly are possible depending upon mounting requirements, etc. Generally speaking, the switch assembly is simply required to interact with lock pin 32 in order to mechanically close a switching element.

Referring again to FIG. 4, switch gauge 10 is shown in its initial condition or reset condition. More specifically, this reset condition is the state of the gauge when no pressure or vacuum signal has been applied at the gauge input 16. In this condition, calibration spring 62 biases diaphragm assembly 60 away from housing 12. When in this reset condition, diaphragm assembly 60 (and specifically lock ring 52) contacts an internal portion of base cap 14. Also, lock ring 52 retains upper portion 56 of lock pin 32 in a central opening. This retention of lock pin 32 in lock ring opening 58 maintains the lock pin in its desired position. More specifically, lock pin lever portion 76 is held above leaf contact lever portion 78. Consequently, the switch formed between leaf contact 74 and base contact 72 is kept open.

As mentioned above, lock gauge 10 is connected to the air intake system of an internal combustion engine. This connection causes internal chamber 64 to be subjected to a vacuum signal. As the air filter of the internal combustion engine becomes dirty and clogged, a higher level vacuum signal is created. This vacuum signal, present in internal chamber 64, will interact with diaphragm assembly 60 to create forces which will oppose calibration spring 62. More specifically, alignment cup 54 will be drawn towards housing 12, thus compressing calibration spring 62.

Switch gauge 10 of the present invention is specifically configured to cause the switches to change state once a predetermined vacuum signal has been experienced. This function is accomplished by the appropriate configuration of lock pin 32 in conjunction with calibration spring 62. (Naturally, other factors will affect the operation of switch gauge 10 such as diaphragm size, lock ring design, etc. All of these elements must cooperate appropriately to achieve the desired function.)

Referring again to FIG. 4, it can be seen that some movement of diaphragm assembly 60 will simply cause lock ring 52 to slide along lock pin upper portion 56. However, at some vacuum level, lock ring 52 will move to a point where lock pin upper portion 56 is no longer contained within lock ring opening 58.

Figure 5:
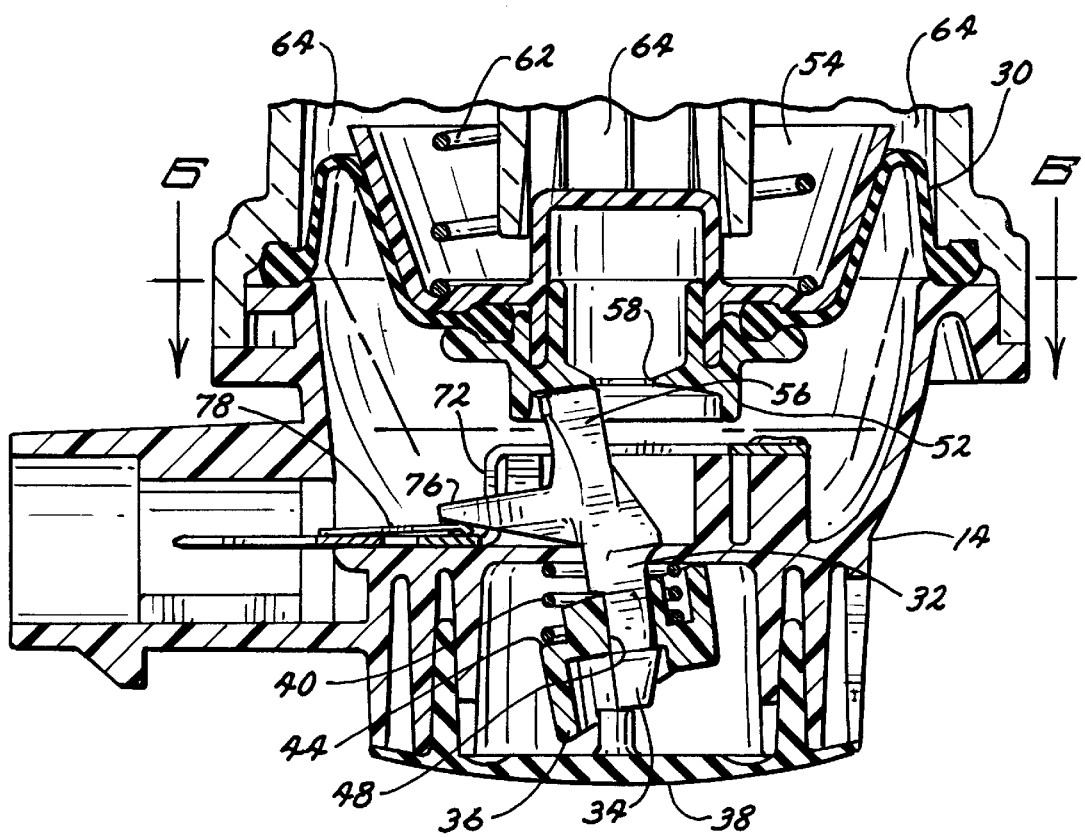
FIG. 5 is a partial section view similar to FIG. 4, showing the lockpin in the locking position.

Referring now to FIG. 5, the lower portion of switch gauge 10 is shown in its set condition. This is representative of the situation where the switch gauge has experienced vacuum signals in its internal chamber 64 which were above the predetermined level. Specifically, lock ring 52 has been moved to a position where lock pin upper portion 56 is no longer contained within lock ring opening 58. When lock pin 32 is no longer contained in lock ring opening 58, reset spring 40 urges lock pin out of alignment with lock ring opening 58. This moves lock pin 32 into contacting relationship with a number of different elements, including lock ring 52. Consequently lock 52 ring is no longer allowed to move back towards the reset condition. Additionally, lever portion 76 of lock pin 32 has now engaged with leaf contact lever portion 78 of switch assembly 70. This movement causes the base contact 72 and leaf contact 74 to be electrically connected to one another. As these two elements form the electrical switching portion of lock gauge 10, this corresponds to the closure of an electrical switch when the predetermined vacuum level has been achieved.

Once switch gauge 10 has reached the set condition, the device must be physically reset in order for it to return to its reset condition. This reset action is achieved by depressing flexible reset cover 38, thus causing the flat portion of reset cover 38 to interact with lock pin 32. This interaction will cause lock pin 32 to move back into alignment with lock ring opening 58. Once lock pin 32 is again aligned with lock pin opening 58, calibration spring 62 urges the diaphragm assembly 60 back to its reset position. This also causes leaf contact 74 and base contact 72 to be separated from one another, thus opening the electrical switch portion of switch gauge 10.

As previously mentioned, switch assembly 70 of the present invention can be configured in either a normally open or normally closed configuration. The previous discussion has generally related to the normally open configuration as is shown in FIGS. 4–8. Referring to FIG. 9, there is shown the switch assembly 70 in its normally closed configuration. This alternative switch assembly 70 is also shown as an alternative configuration in the exploded view of FIG. 3. This alternative switch assembly 70 includes a base contact 72, leaf contact 74 and leaf contact lever portion 78. In the normally closed configuration however, extension 80 is included as part of base contact 72. When assembled in base cap 14, extension 80 is configured to extend above leaf contact lever portion 78. During a normal condition these two elements will be in contact with one another. Subsequently, when switch gauge 80 reaches its set condition, lever portion 76 will urge leaf contact lever portion 78 away from extension 80. As leaf contact lever portion 78 and extension 80 create the electrical switching portion of switch assembly 70, this motion causes the switch to open.

Switch assembly 70, whether in the normally opened or normally closed configuration, includes a pair of connector pins 92 on one end. These connector pins are configured to extend to a connector portion 94 of switch gauge 10. Connector pins 92 can then be attached to an electrical connector (not shown) for carrying the switching signal away from switch gauge 10.

Referring to FIG. 5, as the air filter becomes dirty, further reducing air flow through the air intake system, calibration spring 62 gradually becomes increasingly compressed. Compression of calibration spring 62 causes alignment cup 54 to be drawn closer to attachment member 20, until upper end of lockpin 32 no longer extends into central opening 58 of lock ring 52. Then, as illustrated in FIG. 5, upper end 56 of lockpin 32 no longer extends through central opening 58 of lock ring 52. Rather lock pin upper 56 is moved to a new position which is no longer aligned with opening 58.

Figure 10:
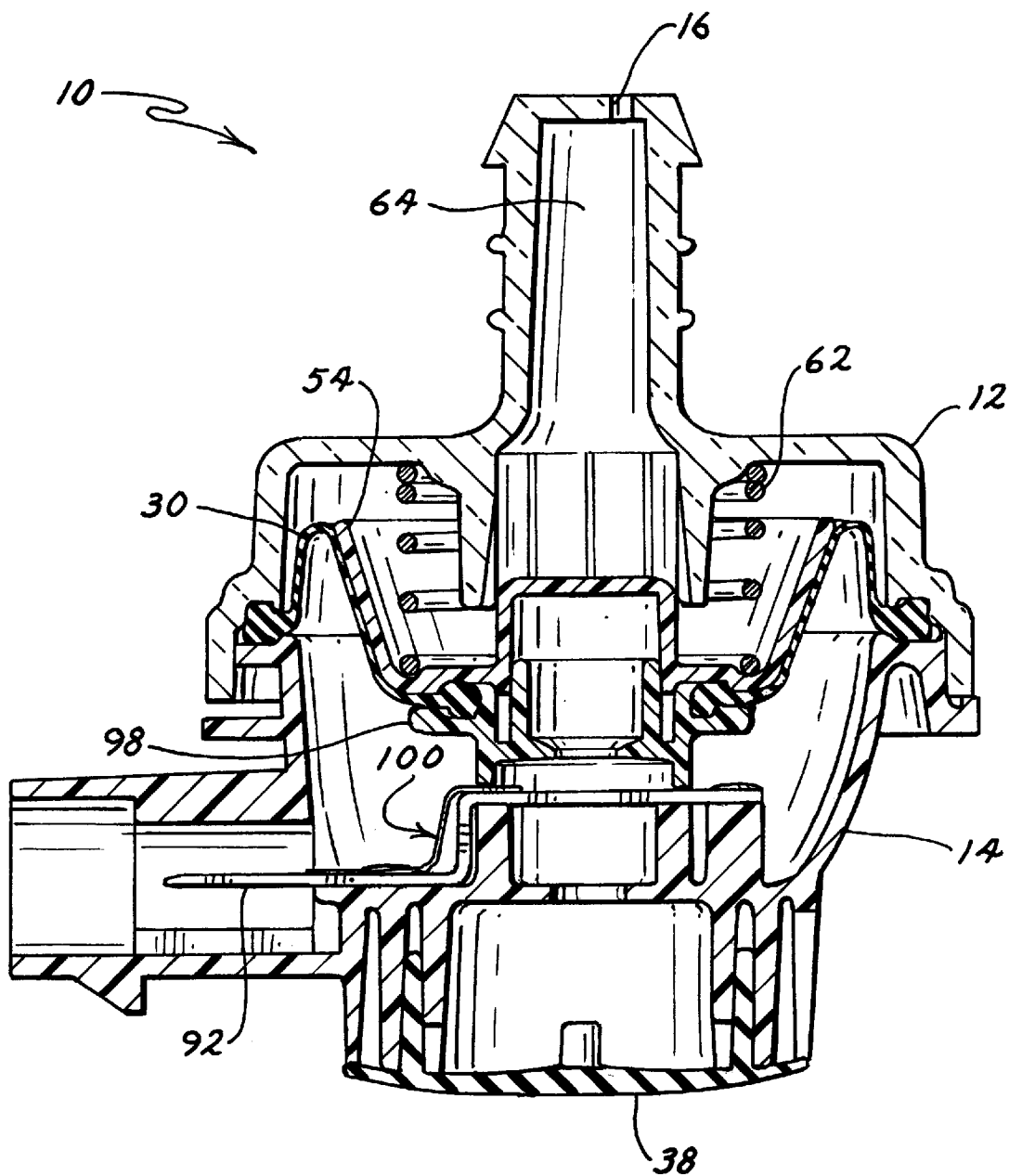
FIG. 10 is a vertical section view of a second embodiment of the present invention, again taken along 4—4 of FIG. 2.
Figure 11:
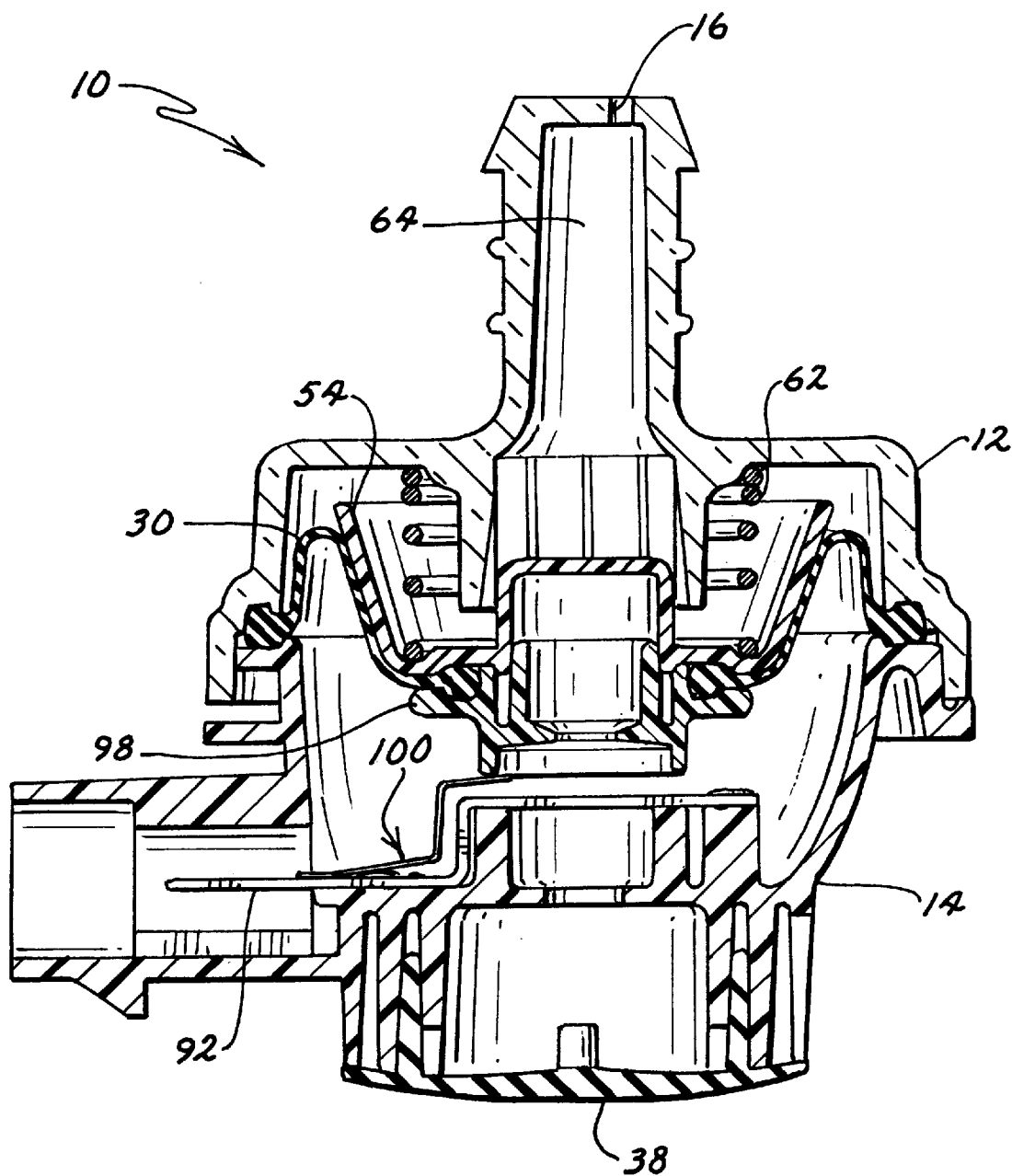
FIG. 11 is again a vertical section view of the alternative embodiment of the present invention taken along 4—4 of FIG. 2 with the cup assembly shown in a second position.

Referring now to FIGS. 10 and 11, there is shown an alternative embodiment of the present invention. This embodiment is similar to that previously discussed, however is designed to operate differently. That is, this embodiment of the present invention produces a first signal when the measured vacuum level is below a predetermined level and produces a second signal when the measured vacuum level is above a predetermined level. However, each time the engine is shut down and the vacuum signal no longer exists, the gauge is brought back to its original condition and the first signal is again produced. Stated alternatively, the gauge of this alternative embodiment does not have a locking or manual reset feature.

Referring specifically to FIGS. 10 and 11, switch gauge 10 includes housing 12 and base cap 14. Switch gauge 10 further includes an input 16 which is configured for connection to the engine air intake system. Switch gauge 10 also has a cup assembly similar to that discussed above. That is, within switch gauge 10 there is situated an alignment cup 54, diaphragm 30 and a lock ring 98. There also exists a calibration spring 62 for biasing diaphragm assembly 60 away from housing 12. By comparing FIG. 10 with FIG. 4, it can be seen that in this alternative embodiment, lock pin 32 has been eliminated. As this embodiment does not include a locking or manual reset feature, lock pin 32 is no longer needed. Consequently, lock ring 98 is also configured differently.

Base cap 14, again has a switch assembly 100 attached thereto. In this embodiment of the invention, lock ring 98 and switch assembly 100 are specifically designed to cooperate with one another to provide the desired electrical switching signals.

Figure 12:
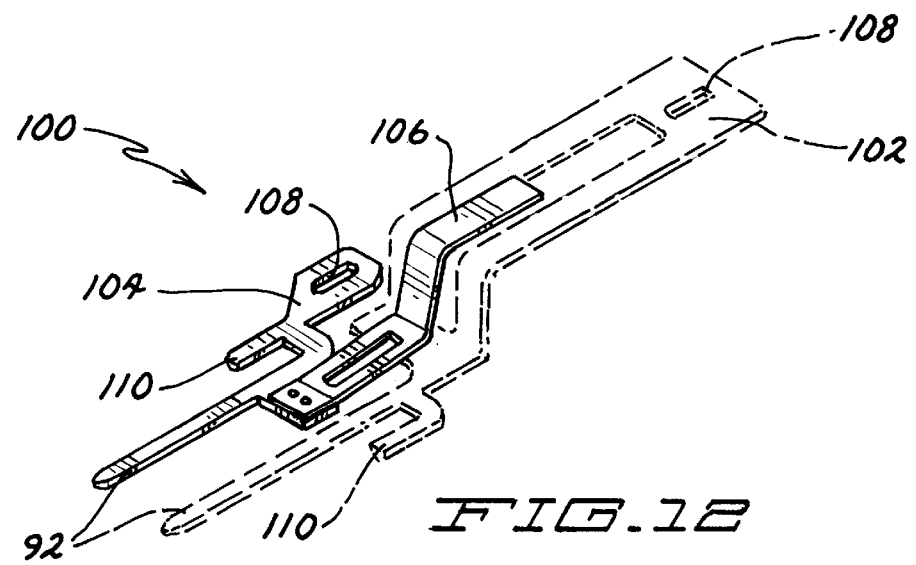
FIG. 12 is a perspective view of an alternative embodiment of the switching assembly.

Referring to FIG. 12, there is shown a perspective view of switch assembly 100. Again, switch assembly 100 includes a base contact member 102 and a leaf contact member 104. Both base contact member 102 and leaf contact member 104 are designed for attachment to base cap 14 while also for providing the appropriate electrical switching functions. Switch assembly 100 further includes a leaf spring member 106 which is connected to leaf contact 104.

Figure 13:
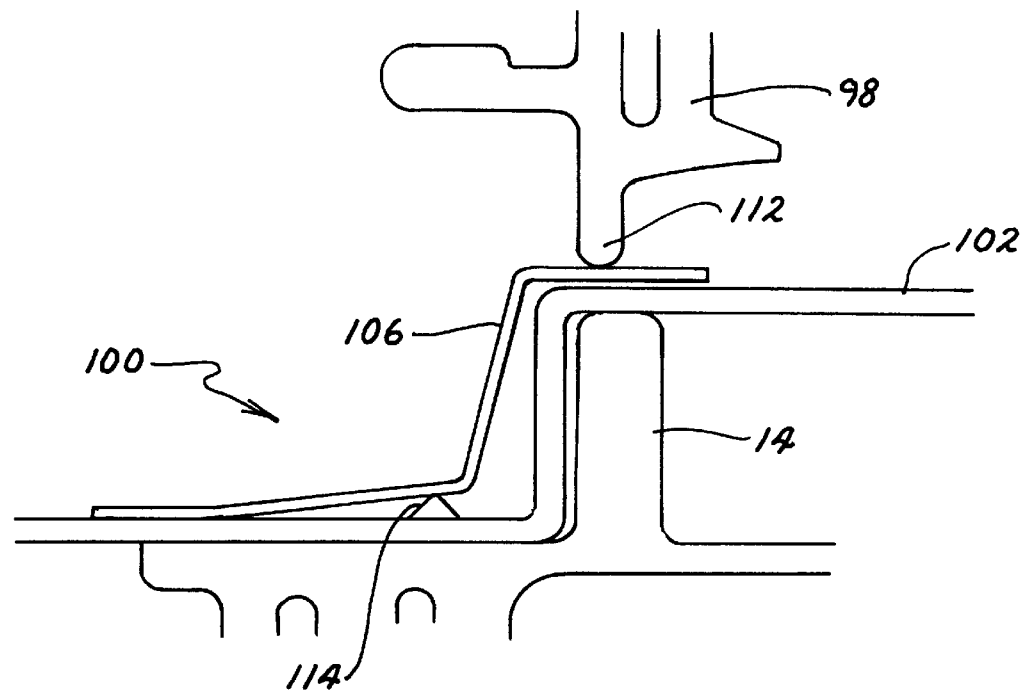
FIG. 13 is a partial side view of the switching assembly shown in FIG. 12 while in its closed position showing a normally closed switch.
Figure 14:
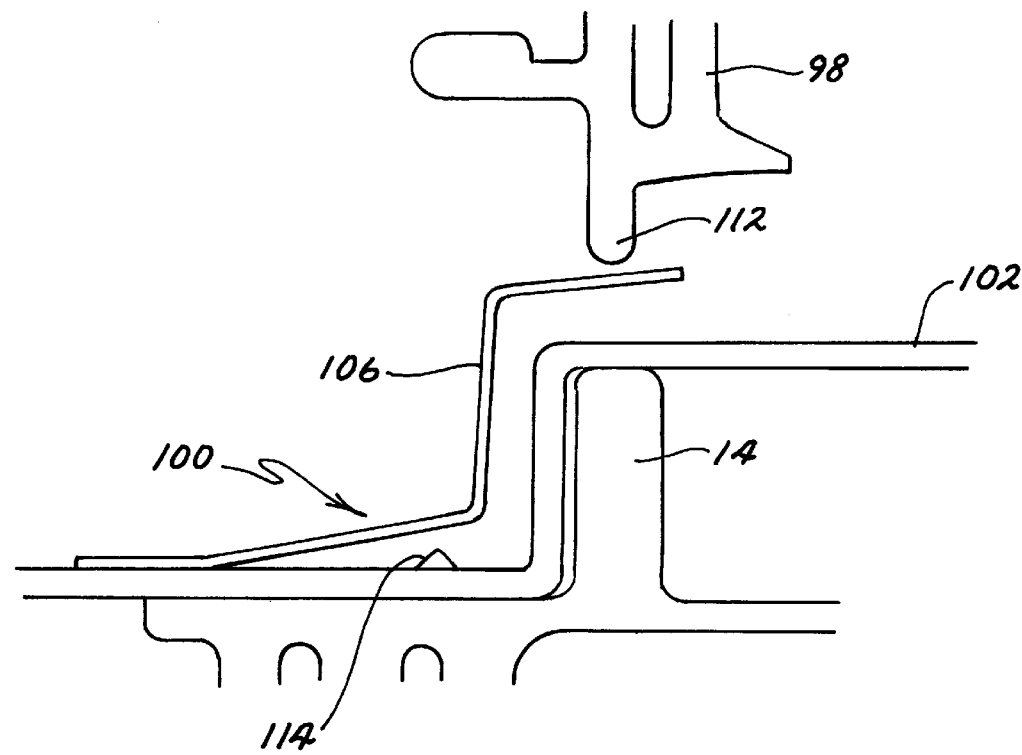
FIG. 14 is a partial view, similar to that shown in FIG. 13, with the switching assembly in its open position.

To accommodate attachment to base cap 14, both base contact member 102 and leaf contact member 104 include alignment holes 108 and mounting tabs 110. As discussed above, these alignment holes 108 and mounting tabs 110 are configured to interact with alignment pins 86 and attachment pins 88, respectively, of base cap 14. As is shown, base contact member 102 includes a step up configuration designed to follow the contour of base cap 14. Referring to FIGS. 13 and 14, this relationship is shown in partial cross-sectional view.

As can be seen by referring to the figures, FIG. 10 shows the lock ring 98 in a first position while FIG. 11 shows lock ring 98 in a second position. The position shown in FIG. 10 is the initial position or position that the lock ring is situated when no vacuum signal is present. Once a vacuum signal is applied at input 16, internal chamber 64 will also be subjected to this vacuum signal. Initially, this will not have a significant effect on switch gauge 10. As discussed above, internal chamber 64 is sealed off by diaphragm 30 and diaphragm assembly 60. Thus, a vacuum signal present in internal chamber 64 will produce a force on diaphragm 30 and diaphragm assembly 60. This force is applied against calibration spring 62 and at some level will produce movement of diaphragm assembly 60. Calibration spring 62 is configured to allow movement at a predetermined vacuum signal level. (It is understood that calibration 62 operates in conjunction with the configuration of diaphragm 30 and diaphragm assembly 60 and these elements together produce this desired result.) Once this predetermined vacuum signal level is reached, diaphragm assembly 60 and specifically locking ring 98 are moved to the position shown in FIG. 11.

Referring again to FIGS. 13 and 14, lock ring 98 is shown in both its initial position (FIG. 13) and its second position (FIG. 14). The movement of lock ring 98 has a related effect on switch assembly 100. When lock ring 98 is in its first or initial position, calibration spring 62 biases an extending edge 112 of lock ring 98 to contact leaf spring 106. This causes leaf spring 106 to contact a switching pin 114 which is electrically connected to base contact member 102. Again, leaf spring 106 is attached to leaf contact member 104 (not shown in FIGS. 13 and 14), thus electrical connection is made between base contact member 102 and leaf contact member 104.

Alternatively, when lock ring 98 is moved to its second position, extension 112 no longer contacts leaf spring 106. Further, contact between switch pin 114 and leaf spring 106 no longer exists. Thus electrical connection between base contact member 102 and leaf contact member 104 is no longer present.

Again referring to FIG. 12, both base contact member 102 and leaf contact member 104 have extending connector pins 92 which are configured to extend partially out of base cap 14. Thus, these connector pins 92 can be electrically connected to other elements.

As outlined above, this second embodiment produces a non-locking version of switch gauge 10. Many identical concepts are shown between this embodiment and the first embodiment described. However, all elements providing related locking and manual reset do not exist.

Figure 15A:
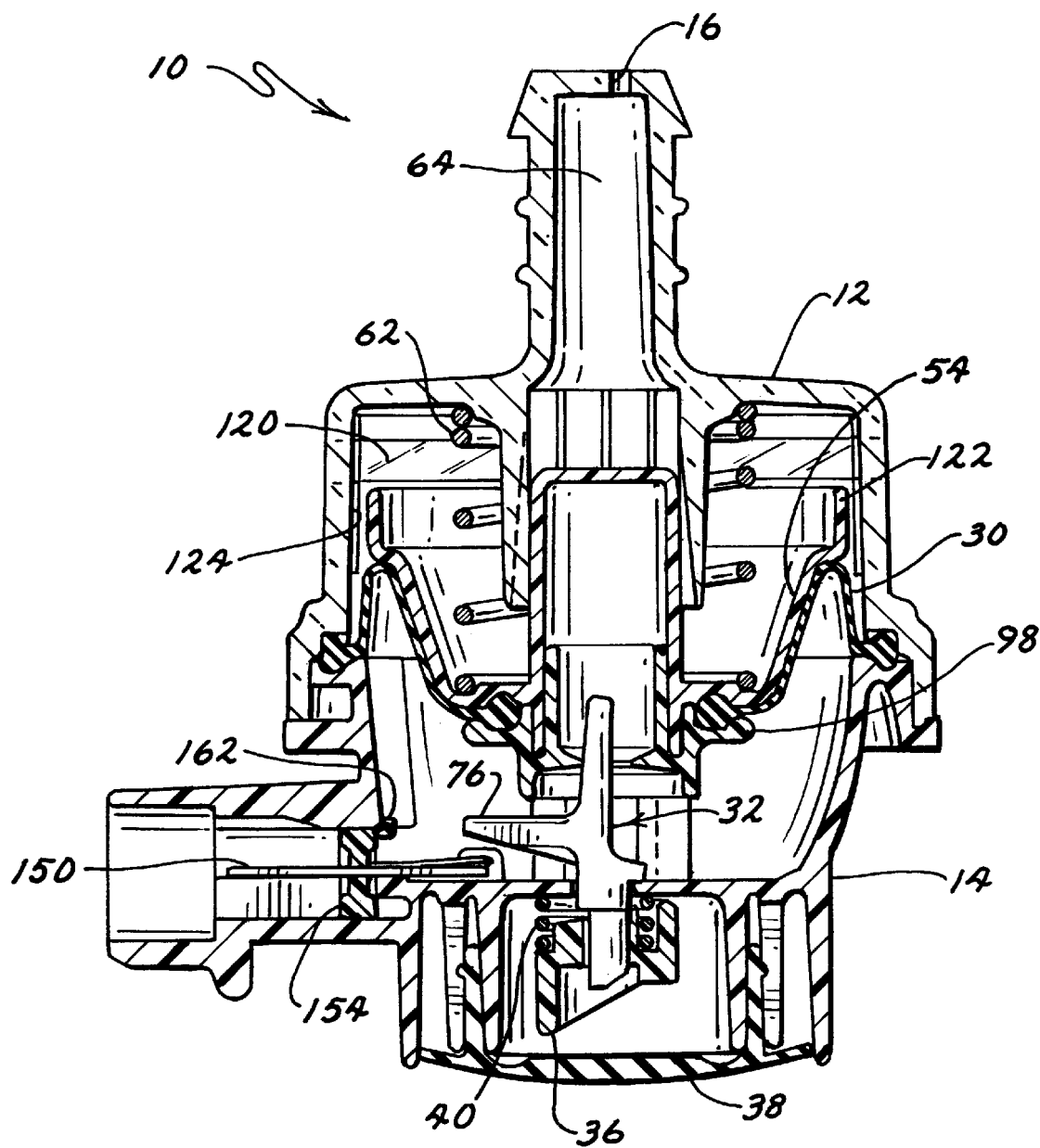
FIG. 15 is a partial cross-sectional view showing an additional embodiment of the present invention which includes a visual indicator.

Referring now to FIG. 15, there is shown an additional modification of the present invention which provides an additional visual indication. Specifically, switch gauge 10 has been slightly modified to provide a visual indication that the predetermined vacuum level has been achieved. This visual indication is in addition to the electrical signal that is being provided. In this case, housing 12 has been slightly modified to include a view window 120. This view window includes a clear portion in the housing through which portions of the internal structure can be seen.

Figure 15B:
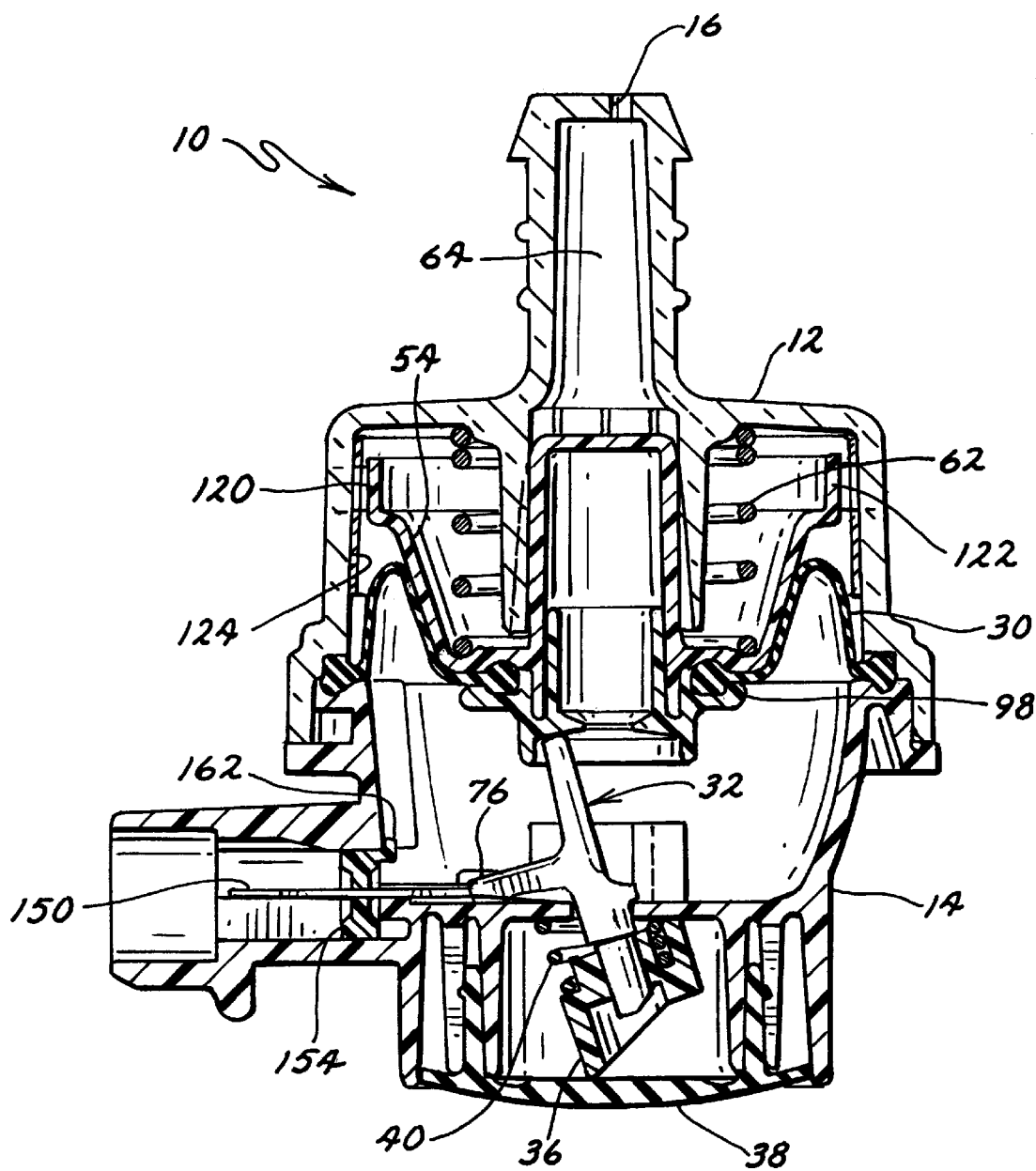

Additionally, alignment cup 54 has been slightly altered to include an indicator extension 122. Indicator extension 122 is specifically configured so as to not interfere with diaphragm 30 while also being located in close proximity to an inner wall 124 of housing 12. In FIG. 15(B), switch gauge 10 is shown in its set position, thus diaphragm assembly 60 has been extended to an upper location within housing 12. In this upper location, indicator extension 122 is positioned immediately adjacent to view window 120. By manufacturing cup 54 so that indicator extension 122 is a noticeable color, this indicator extension will be readily apparent to the user. This provides the desired visual indication, in addition to the electrical signal indications previously discussed. Preferably, the indicator extension 122 would be brightly colored including red, orange, florescent green, or some other highly visible color.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments which have been described in detail therein. Rather, reference should be made to the appended claims as indicative of the scope and content of the present invention.

What is claimed is:

1. A filter restriction indicator device for monitoring the level of restriction that a filter is experiencing by attaching to the intake of an engine, the restriction indicator device comprising:

a housing having an inlet in communication with the engine intake;

a diaphragm assembly attached to the housing so as to form an internal chamber within the housing which is in communication with the inlet; the diaphragm assembly having a movable diaphragm which is responsive to a pressure signals existing within the internal chamber, the diaphragm assembly further having a sealing ring attached to the diaphragm opposite the housing;

a base cap attached to the housing so as to position the diaphragm assembly between the housing and the base cap;

a lock pin movably attached to the base cap, the lock pin including a lever arm and an extension which extends away from the base cap, the extension interacting with the sealing ring such that the lock pin is capable of being aligned in a first alignment when the pressure signal is above the predetermined level while the lock pin is capable of being aligned in a second alignment when the pressure signal is below the predetermined level; and a switch attached to the base cap and cooperating with the sealing ring such that the switch is in a first position when the pressure signal is above a predetermined level and the switch is in a second position when the pressure signal is below the predetermined level.

2. The filter restriction indicator device of claim 1 wherein the switch includes a switching lever and the sealing ring directly contacts the switching lever.

3. The filter restriction indicator device of claim 1 wherein the switch includes a switching lever and the lever arm interacts with the switching lever to open and close the switch.

4. A restriction indicating device for an air filter used with a vehicle having an internal combustion engine, a power source and a passenger compartment, the restriction indicating device being in fluid communication with the air flowing from the air filter to the air intake of the internal combustion engine, the restriction indicating device comprising:

a housing having an inner chamber;

a base cap assembly attached to said housing;

an attachment member attached to the air intake system of the vehicle, allowing fluid communication of the air intake system with said inner chamber of said housing;

an alignment cup contained within said housing, said alignment cup being slidably positionable between a between a first position indicating that the air filter is clean and a second position indicating that the air filter is dirty;

a calibration spring biasing said alignment cup toward said first position;

a diaphragm attached to said alignment cup and said housing, dividing the interior of said housing from the interior of said base cap assembly;

a lock ring fixedly attachable to said alignment cup, said lock ring having a central ring and a lower lip;

a lockpin coupled to said base cap assembly, said lockpin being moveable between a first operating position wherein a portion of said lockpin is located within said central ring of said lock ring thereby permitting slidable movement of said alignment cup, and a second operating position wherein said lockpin is disengaged from said central ring and said lockpin engages said lower lip of said lock ring thereby preventing slidable movement of said alignment cup in at least one direction; and a switch assembly actuable with a switch actuator integral with and projecting from said lockpin, said switch assembly actuating an electrical circuit for activating a signal device in the passenger compartment of the vehicle, only when said lockpin is in said second position.

5. The air filter restriction indicating device described in claim 4, further comprising:

a reset assembly, said reset assembly comprising:

a reset button pivotally connected to said base cap assembly and engageable with a lockpin base portion extending from said lockpin; and a reset spring biasing said reset button toward a neutral position, whereby depressing said reset button overcomes the bias of said reset spring, and disengages said lower lip of said lock ring from said lockpin.

6. The air filter restriction indicating device described in claim 4, wherein said switch assembly comprises:

a switch actuator projecting from said lockpin;

a base portion mounted to said base cap assembly;

a flexible leaf portion fixedly attached to and biased away from said base portion, said leaf portion extending outwardly for contact with said switch actuator of said lockpin;

at least one switch terminal attached to and projecting from said base portion for electrical communication with the signaling, device in the passenger compartment of the vehicle; and a switch contact fixedly attached to said base portion, for contact with said leaf portion, whereby said switch assembly is normally open, and the loading of the air filter results in said alignment cup moving toward said second position, resulting in said switch actuator bearing against said leaf portion until it contacts said switch contact, closing a circuit energized by the vehicle power source, and thereby actuating said signal device in the passenger compartment of the vehicle.

7. The air filter restriction indicating device described in claim 6, further comprising:

a plurality of posts projecting from said base portion, whereby said posts abut against and engage said base portion to maintain said base portion in fixed position relative to said lockpin switch actuator.

8. The air filter restriction indicating device described in claim 4, wherein said switch assembly comprises:

a switch actuator projecting from said lockpin;

a base portion mounted to said base cap assembly;

a flexible leaf portion fixedly attached to and biased away from said base portion, said leaf portion extending outwardly for contact with said switch actuator of said lockpin;

at least one switch terminal attached to and projecting from said base portion for electrical communication with the signaling device in the passenger compartment of the vehicle; and a switch contact fixedly attached to said base portion, for contact with said leaf portion, whereby said switch assembly is normally closed, and the loading of the air filter results in said alignment cup moving toward said second position, resulting in said switch actuator bearing against said leaf portion until it breaks contact with said switch contact, opening a circuit energized by the vehicle power source, and thereby actuating said signal device in the passenger compartment of the vehicle.

9. The air filter restriction indicating device described in claim 4, wherein said switch assembly comprises:

a switch actuator projecting from said lockpin;

at least one retention member for engagement with an at least one corresponding retention pocket on said base cap assembly, whereby said at least one retention pocket assists in the proper positioning of said switch assembly with respect to said base cap assembly;

a flexible leaf portion fixedly attached to and biased away from said at least one retention member, said leaf portion extending outwardly for contact with said switch actuator of said lockpin;

at least one switch terminal attached to and projecting from said at least one retention member, for electrical communication with the signaling device in the passenger compartment of the vehicle; and a switch contact fixedly attached to said at least one retention member, for contact with said leaf portion, whereby said switch assembly is normally open, and the loading of the air filter results in said alignment cup moving toward said second position, resulting in said switch actuator bearing against said leaf portion until it contacts said switch contact, closing a circuit energized by the vehicle power source, and thereby actuating said signal device in the passenger compartment of the vehicle.

10. The air filter restriction indicating device described in claim 9, further comprising:

a terminal housing including a first aperture for securely receiving said at least one switch terminal; and a retention tab projecting from said terminal housing for secure engagement with said base cap assembly.

11. The air filter restriction indicating device described in claim 10, further comprising:

a second switch terminal projecting from a second retention member, said second retention member engageable with a second retention pocket on said base cap assembly; and a second aperture on said terminal housing for securely receiving said second switch terminal.

12. The air filter restriction indicating device described in claim 9, further comprising:

first and second rib portions projecting outwardly from said base cap assembly, whereby said rib portions assure proper positioning of said lockpin with respect to said switch assembly.

13. A restriction indicating device for an air filter used with a vehicle having an internal combustion engine, a power source and a passenger compartment, the restriction indicating device being in fluid communication with the air flowing from the air filter to the air intake of the internal combustion engine, the restriction indicating device comprising:

a housing having an inner chamber;

a base cap assembly attached to said housing;

an attachment member attached to the air intake system of the vehicle, allowing fluid communication of the air intake system with said inner chamber of said housing;

an alignment cup contained within said housing, said alignment cup being slidably and linearly positionable along a first axis, between a first position indicating that the air filter is clean and a second position indicating that the air filter is dirty;

a calibration spring biasing said alignment cup toward said first position;

a diaphragm attached to said alignment cup and said housing, dividing the interior of said housing from the interior of said base cap assembly;

a lockpin pivotally attached to said base cap assembly to allow pivotal movement about a second axis that is perpendicular to said first axis; and a switch assembly actuable with a switch actuator integral with and projecting from said lockpin, said switch assembly actuating an electrical circuit for activating a signal device in the passenger compartment of the vehicle only when said alignment cup has moved along said first axis a sufficient distance to allow the pivotal movement of said switch actuator to pivot into contact with said switch assembly.

14. The air filter restriction indicating device described in claim 13, further comprising:

a lock ring fixedly attachable to said alignment cup, said lock ring having a central ring and a lower lip, wherein said lockpin is moveable between a first operating position wherein said lockpin is disposed within said central ring so that said alignment cup is free to move along said first axis, and a second operating position wherein said lockpin is disengaged from said central ring and said lockpin engages said lower lip of said lock ring preventing said alignment cup from moving along the first axis in at least one direction.

15. The air filter restriction indicating device described in claim 14 wherein said switch assembly is actuated by said switch actuator only when said lockpin is in said second position.

16. The air filter restriction indicating device described in claim 13, further comprising:

a reset assembly, said reset assembly comprising:

a reset button pivotally connected to said base cap assembly and engageable with a lockpin base portion extending from said lockpin; and a reset spring biasing said reset button toward a neutral position, whereby depressing said reset button overcomes the bias of said reset spring, and disengages said central ring of said lock ring from said toothed portion of said lockpin, permitting movement of said alignment cup from said second position to said first position.

17. The air filter restriction indicating device described in claim 13, wherein said switch assembly comprises:

a switch actuator projecting from said lockpin;

a base portion mounted to said base cap assembly;

a flexible leaf portion fixedly attached to and biased away from said base portion, said leaf portion extending outwardly for contact with said switch actuator of said lockpin;

at least one switch terminal attached to and projecting from said base portion for electrical communication with the signaling device in the passenger compartment of the vehicle; and a switch contact fixedly attached to said base portion, for contact with said leaf portion, whereby said switch assembly is normally open, and the loading of the air filter results in said alignment cup moving toward said second position, resulting in said switch actuator bearing against said leaf portion until it contacts said switch contact, closing a circuit energized by the vehicle power source, and thereby actuating said signal device in the passenger compartment of the vehicle.

18. The air filter restriction indicating device described in claim 17, further comprising:

a plurality of posts projecting from said base portion, whereby said posts abut against and engage said base portion to maintain said base portion in fixed position relative to said lockpin switch actuator.

19. The air filter restriction indicating device described in claim 13, wherein said switch assembly comprises:

a switch actuator projecting from said lockpin;

a base portion mounted to said base cap assembly;

a flexible leaf portion fixedly attached to and biased away from said base portion, said leaf portion extending outwardly for contact with said switch actuator of said lockpin;

at least one switch terminal attached to and projecting from said base portion for electrical communication with the signaling device in the passenger compartment of the vehicle; and a switch contact fixedly attached to said base portion, for contact with said leaf portion, whereby said switch assembly is normally closed, and the loading of the air filter results in said alignment cup moving toward said second position, resulting in said switch actuator bearing against said leaf portion until it breaks contact with said switch contact, opening a circuit energized by the vehicle power source, and thereby actuating said signal device in the passenger compartment of the vehicle.

20. The air filter restriction indicating device described in claim 13, wherein said switch assembly comprises:

a switch actuator projecting from said lockpin;

at least one retention member for engagement with an at least one corresponding retention pocket on said base cap assembly, whereby said at least one retention pocket assists in the proper positioning of said switch assembly with respect to said base cap assembly;

a flexible leaf portion fixedly attached to and biased away from said at least one retention member, said leaf portion extending outwardly for contact with said switch actuator of said lockpin;

at least one switch terminal attached to and projecting from said at least one retention member, for electrical communication with the signaling device in the passenger compartment of the vehicle; and a switch contact fixedly attached to said at least one retention member, for contact with said leaf portion, whereby said switch assembly is normally open, and the loading of the air filter results in said alignment cup moving toward said second position, resulting in said switch actuator bearing against said leaf portion until it contacts said switch contact, closing a circuit energized by the vehicle power source, and thereby actuating said signal device in the passenger compartment of the vehicle.

21. The air filter restriction indicating device described in claim 20, further comprising:

a terminal housing, including a first aperture for securely receiving one of said at least one switch terminal; and a retention tab projecting from said terminal housing for secure engagement with said base cap assembly.

22. The air filter restriction indicating device described in claim 21, further comprising:

a second switch terminal projecting from a second retention member, said second retention member engageable with a second retention pocket on said base cap assembly; and a second aperture on said terminal housing for securely receiving said second switch terminal.

* * * * *

UNITED STATES PATENT AND TRADEMARK OFFICE
CERTIFICATE OF CORRECTION

PATENT NO.    : 6,307,466 B1
DATED         : October 23, 2001
INVENTOR(S)   : Gregory M. Ferris It is certified that error appears in the above-identified patent and that said Letters Patent is hereby corrected as shown below:

<u>Column 4,</u>
Line 39, delete "bring" and insert -- being --

<u>Column 8,</u>
Line 14, delete "lock 52 ring" and insert -- lock ring 52 --
Line 50, delete "80" and insert -- 10 --

<u>Column 11,</u>
Line 63, delete "between a"

<u>Column 12,</u>
Line 42, delete "," after "signaling"

Signed and Sealed this

Twenty-sixth Day of March, 2002

Attest:

*Attesting Officer*

JAMES E. ROGAN
*Director of the United States Patent and Trademark Office*